US010637359B2

United States Patent

Schaemann et al.

(10) Patent No.: US 10,637,359 B2
(45) Date of Patent: Apr. 28, 2020

(54) POWER CONVERTER CONTROLLER, POWER CONVERTER, AND CORRESPONDING METHODS

(71) Applicant: INFINEON TECHNOLOGIES AUSTRIA AG, Villach (AT)

(72) Inventors: Marcus Schaemann, Munich (DE); Tiam Poh Lau, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/242,935

(22) Filed: Jan. 8, 2019

(65) Prior Publication Data

US 2019/0222125 A1    Jul. 18, 2019

(30) Foreign Application Priority Data

Jan. 15, 2018 (DE) .................. 10 2018 100 709

(51) Int. Cl.
| | |
|---|---|
| *H05B 33/00* | (2006.01) |
| *H02M 3/335* | (2006.01) |
| *H02M 1/08* | (2006.01) |
| *H05B 33/08* | (2020.01) |

(52) U.S. Cl.
CPC ......... *H02M 3/33523* (2013.01); *H02M 1/08* (2013.01); *H05B 33/0815* (2013.01); *H05B 33/0845* (2013.01)

(58) Field of Classification Search
CPC .. H01F 38/14; H02G 13/00; H02J 4/00; H02J 50/12; H02J 50/40; H02J 50/70; H02J 5/005; H02J 7/025; H02M 3/156; H02M 1/12; H02M 1/14; H02M 1/32; H02M 1/44; H02M 3/33507; H02M 3/33569; H05B 33/0815; H05B 33/0818; H05B 33/0845; H05B 33/0851; H05B 37/02
See application file for complete search history.

(56) References Cited

U.S. PATENT DOCUMENTS

| | | | |
|---|---|---|---|
| 2003/0174520 A1 | 9/2003 | Bimbaud | |
| 2005/0146901 A1 | 7/2005 | Yamada | |
| 2009/0058387 A1 | 3/2009 | Huynh et al. | |
| 2010/0309690 A1 | 12/2010 | Kawabe et al. | |
| 2015/0035450 A1* | 2/2015 | Werner | H05B 33/0851 315/291 |
| 2017/0085183 A1* | 3/2017 | Notsch | H02M 3/33507 |
| 2017/0373496 A1 | 12/2017 | Hu | |

FOREIGN PATENT DOCUMENTS

JP    H09-19143 A    1/1997

OTHER PUBLICATIONS

Office action, Application No. 10 2018 100 709.4, dated Sep. 4, 2018, pp. 9.

* cited by examiner

*Primary Examiner* — Monica C King
(74) *Attorney, Agent, or Firm* — Armis IP Law, LLC (57) ABSTRACT

Power converter controllers, power converters and corresponding methods are provided. A power converter controller may have a first input for receiving an indication of an output of the power converter and a second input operative to receive a supply voltage. A control circuit of the power converter controller (10) controls a primary side switch of the power converter based on both the supply voltage and the indication.

25 Claims, 4 Drawing Sheets

POWER CONVERTER CONTROLLER, POWER CONVERTER, AND CORRESPONDING METHODS

RELATED APPLICATION

This application is related to and claims priority to earlier filed German Patent Application Serial Number 102018100709.4 entitled "Power converter controller, power converter and corresponding methods," (German Attorney Docket No. 32699DE), filed on Jan. 15, 2018, the entire teachings of which are incorporated herein by this reference.

BACKGROUND

Power converters are used to convert an electrical input power to an output power and are for example frequently used in power supplies to generate a voltage and/or current for a certain appliance based on an externally supplied power, for example a mains power. Power converters may for example be voltage converters converting an input voltage to one or more output voltages, which may be regulated to one or more predefined voltage levels.

Voltage controllers include AC/DC (alternating current/direct current) converters, DC/DC converters or DC/AC converters. One class of such voltage converters includes switched mode power supplies (SMPS). An SMPS uses controlled charging and discharging of an inductor or transformer by operating one or more switches which a switching frequency and is an efficient way to convert power. Examples for SMPS include buck converters, boost converters, flyback converters or resonant converters like LLC (inductor-inductor-capacitor) converters.

In some applications, power converters are required to support operation under various load conditions, ranging from a high load to a light load where very little or no power is required. For example, in lighting applications like power supplies for light emitting diode (LED) arrangements light sources like LEDs may be made dimmable. In such cases, the light output may be essentially continuously regulated between a full light output (brightest operation) to no light output (switched-off state, dark). In such applications, the required output power may vary between a full output power and zero continuously.

To provide a required output power, for example output voltage, conventionally a feedback loop is used which provides an indication of the output to a controller of the power supply. This ensures that for example the voltage for a light source arrangement like an LED arrangement is stable under all load conditions and corresponds to a voltage required by the light source arrangement.

In some applications, besides a variable load like a light source arrangement, other loads have to be supplied by the power supply, such as sensors or communication devices for example for Bluetooth communication, ZigBee communication or Wi-Fi communication. A straight forward way to provide power to such other loads is to provide a plurality of power supplies. However, this is a costly solution, and therefore it may be desirable to supply various loads with a single power supply. One way to do this is using a power converter type which supports a plurality of outputs, for example a flyback converter with a plurality of secondary windings. The turns ratio of the respective windings determines a voltage ratio between the different outputs and an input voltage. For ease of explanation, an output of the power converter to which a main load (for example light source arrangement) is connected will be referred to as main output, whereas an output to which other loads are connected will be referred to as auxiliary output herein.

In some implementations, only the main output is regulated based on a feedback signal as discussed above. In such a case, when the load coupled to the main output drops, for example when a light source arrangement is turned off, the main output requests only minimal power. If a load on the auxiliary output is high during this time, the average voltage provided on the auxiliary output may drop too low, and ripples of the auxiliary output voltage may become high, which is undesirable.

Besides providing a separate power supply, a conventional approach to remedy this problem is the use of a plurality of feedback signals, one from each output and combining the feedbacks to a single feedback signal, which is then used for regulation. While this may in some implementations ensure a good regulation of all regulated outputs, the system optimization to combine both feedback signals is complicated to provide a stable overall regulation. Moreover, it may be difficult to provide an isolation (galvanic separation between output side and input side of the power supply) for all feedback signals, and the number of components needed to implement such a solution may be high, which increases costs. Also other conventional solutions may have their drawbacks.

SUMMARY

In an embodiment, a power converter controller is provided, comprising:
a first input operative to receive an indication of an output of a power converter,
a second input operative to receive a supply voltage, and
a control circuit operative to be supplied with power by the supply voltage and operative to:
determining on-times of a primary side switch of the power converter based on both the indication and the supply voltage, and
controlling the primary side switch based on the determined burst time duration.

In another embodiment, a power converter controller is provided, comprising:
a first input operative to receive an indication of an output of a power converter,
a second input operative to receive a supply voltage, and
a control circuit operative to be supplied by the supply voltage with power and to
determine a burst length of a primary side switch of a power converter based on the indication of the output,
selectively extend the burst length based on the supply voltage, and
generate a burst mode control signal for the primary side switch based on the selectively extended burst length.

According to another embodiment, a power converter controller (10; 215) is provided, comprising:
a first input (14; FB) operative to receive an indication of an output of a power converter,
a second input (13; VCC) operative to receive a supply voltage, and
a control circuit (15) operative to be supplied with power by the supply voltage and comprising a computer-readable storage medium having a program code and a processor, wherein the program code, when executed by the processor:
determines on-times of a primary side switch (214) of the power converter based on both the indication and the supply voltage, and controls the primary side switch (214) based on the determined burst time duration.

According to another embodiment, a power converter controller (10; 215) is provided, comprising:

a first input (14; FB) operative to receive an indication of an output of a power converter, a second input (13; VCC) operative to receive a supply voltage, and a control circuit (15) operative to be supplied with power by the supply voltage and comprising a computer-readable storage medium having a program code and a processor, wherein the program code, when executed by the processor:

determines a burst length of a primary side switch (214) of a power converter based on the indication output, selectively extends the burst length based on the supply voltage, and generates a burst mode control signal for the primary side switch (214) based on the selectively extended burst length.

According to another embodiment, a power converter controller (10; 215) is provided, comprising:

a first input (14; FB) operative to receive an indication of an output of a power converter, a second input (13; VCC) operative to receive a supply voltage, and a control circuit (15) operative to be supplied by the supply voltage with power and comprising:

means for determining a burst length of a primary side switch (214) of a power converter based on the indication of the output, means for selectively extending the burst length based on the supply voltage, and means for generating a burst mode control signal for the primary side switch (214) based on the selectively extended burst length.

According to another embodiment, a power converter controller (10; 215) is provided, comprising:

a first input (14; FB) operative to receive an indication of an output of a power converter, a second input (13; VCC) operative to receive a supply voltage, and a control circuit (15) operative to be supplied by the supply voltage with power and comprising:

means for determining a burst length of a primary side switch (214) of a power converter based on the indication of the output, means for selectively extending the burst length based on the supply voltage, and means for generating a burst mode control signal for the primary side switch (214) based on the selectively extended burst length.

In yet a further embodiment, a power converter is provided, comprising:

a voltage input coupled to a primary winding of a transformer, a first secondary winding coupled to a main output of the power converter, a second secondary winding coupled to an auxiliary output of the power converter, a primary side switch coupled to the primary winding of the transformer, a power converter controller as defined above, wherein the controller is operative to control the primary side switch using the generated control signal, a feedback path coupling the main output to the first input of the power converter controller, and an auxiliary winding coupled to the second input of the power converter controller.

In another embodiment, a method of operating a power controller is provided, comprising:

receiving an indication of an output of the power converter, receiving a supply voltage generated by the power controller, wherein the supply voltage supplies a controller of the power converter with power, determining, by the controller, on-times of a primary side switch of the power converter based on both the indication and the supply voltage, and controlling, by the controller, the primary side switch based on the on-time.

The above summary is merely intended to give a brief overview over some features of some embodiments and is not to be construed as limiting. In particular, other embodiments may comprise other features than the ones explicitly described above.

DETAILED DESCRIPTION

In the following, various embodiments will be described in detail referring to the attached drawings. It should be noted that these embodiments are given as examples only and are not to be construed in a limiting sense. For example, while embodiments may be described as comprising numerous details or elements, in other embodiments some of these details or elements may be omitted, and/or may be replaced by alternative features or elements. Furthermore, in addition to the features or elements explicitly shown and described, other features or elements, for example features or elements used in conventional power converters, may be provided.

Features from different embodiments may be combined to form further embodiments. Variations and modifications described for one of the embodiments may also be applicable to other embodiments.

Electrical connections or couplings shown in the drawings or described herein may be modified as long as the general purpose of the connection or coupling, for example to transmit a certain kind of signal or a certain kind of information, is not significantly altered. For example, intervening elements may be added to or removed from electrical connections or couplings as long as this essentially does not change the general purpose of the connection or coupling.

In some embodiments, specific power converter topologies, in particular voltage converter architectures are used as non-limiting examples, for example flyback converter topologies. It is to be noted that concepts and techniques described herein may be applied to various kinds of power converters, for example LLC converters or other resonant converters or generally converters which use a galvanic isolation between an input side and an output side. Furthermore, techniques discussed herein may be applied to power converters with or without power factor correction (PFC).

Therefore, giving specific examples for power converters is not to be construed as limiting.

A part of a power converter to which an input power, for example input voltage is supplied, will also be referred to as primary side herein. A part of the power converter outputting an output power at one or more output terminals, for example different output voltages to supply different loads, will be referred to as secondary side herein. Primary side and secondary side may be galvanically isolated from each other, for example using transformer arrangements. In some embodiments, a primary side switch, e.g. transistor switch, is used to selectively provide power. A switch is referred to as closed or on if it provides a low-ohmic conductive path between terminals, and as open or off if it is essentially electrically insulating between the terminals.

In some embodiments, switching off a primary side switch of the power converter which determines an amount of power to be supplied to the secondary side of the power converter is based both on a supply voltage provided to a power converter controller and an output indication received as feedback from the secondary side of the power converter. In particular, in some embodiments, durations of on-times of the primary side switch may be determined based on the output indication, and these determined durations of the on-times may then be selectively extended based on the supply voltage, for example to ensure an auxiliary output of the output converter providing a minimum amount of power. On-times, in this respect, refers to times during which the primary side switch is closed (ON), i.e. is highly conducting (closed, ON, or short circuit) such that power may be supplied (for example via a transformer) to the secondary side. In other words, the determined on-times indicate when the primary side switch is to be switched on (such as activated to provide a low impedance or highly conductive path between a drain and source). Off-times refers to a time where the primary side switch is open (such as an open circuit), thus supplying no power.

Determining on-times may include determining a pattern of on-times and off-times or in other words a switching pattern according to which the primary side switch is switched on and off, including e.g. determining a frequency of the pattern. Such switching patterns may take any form, e.g. switching may occur in bursts or according to a pulse width modulation scheme. The duration of the on-times may either by limited by a predefined timing or by the primary peak-current.

The output indication may be indicative of an output voltage or output current. Determining the on-times based on the output indication may serve to maintain a desired output voltage or (peak) output current. Therefore, determining the on-times is not limited to any specific form of on-times or any particular output indication.

A supply voltage, as used herein, generally refers to a voltage which is provided to supply circuits with power to enable their operation, corresponding to the common use of the word supply voltage. Signals which do not supply circuits, but merely provide information, for example feedback signals, are not considered to be supply voltages in this sense.

Figure 1:
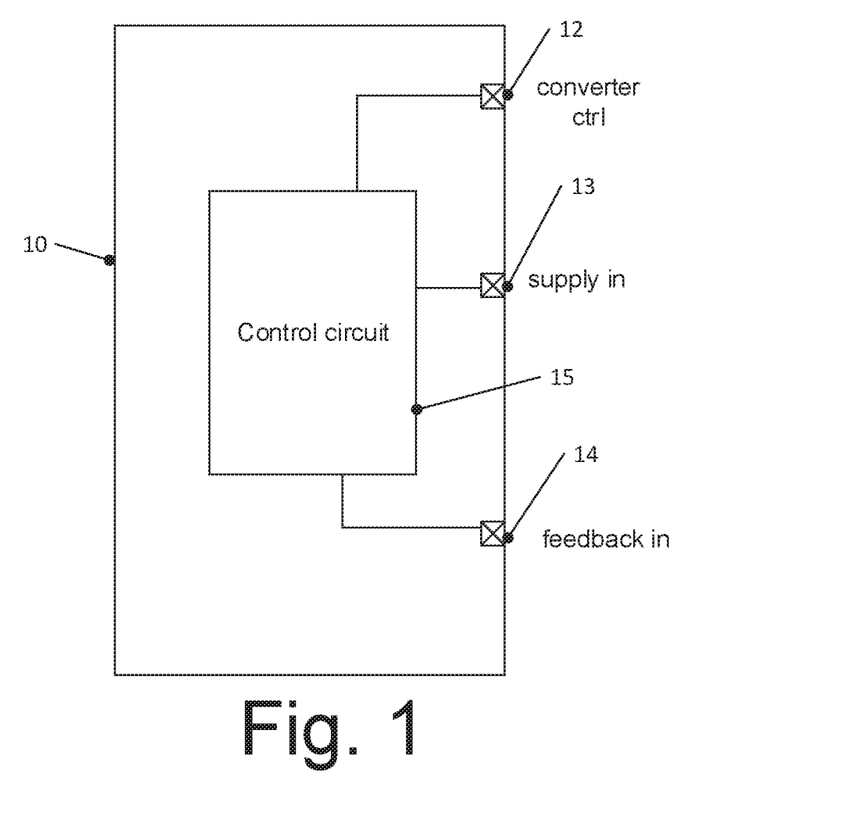
FIG. 1 is a block diagram of a power converter controller according to an embodiment.

Turning now to the figures, FIG. 1 schematically shows a power converter controller 10 according to some embodiments implementing techniques discussed herein. Power converter controller 10 of FIG. 1 is shown as comprising a converter control terminal 12, a supply input terminal 13 and a feedback input terminal 14. Power converter controller 10 of FIG. 1 further comprises a control circuit 15. Control circuit 15 may for example comprise a logic circuit, an application specific integrated circuit (ASIC) or a computer readable storage memory (for example read or only memory, flash memory etc.) having a program stored thereon and a processor for executing the program to perform techniques as discussed herein, but is not limited thereto.

Controller 10 is supplied via supply input terminal 13 with a supply voltage enabling its operation. Controller 10 may in particular be used in systems where a corresponding power converter itself provides the supply voltage for controller 10. For example, such a supply voltage, as will be explained later, may be generated using an auxiliary winding of a transformer. Therefore, in the embodiment of FIG. 1, the control circuit is supplied by the supply voltage received at terminal 13 to be operational. In embodiments, in addition to supplying the controller with power, the supply voltage is used to determine duration of on-times of a primary side switch controlled via terminal 12.

Furthermore, control circuit 15 receives a feedback signal indicative of an output of the power converter (for example indicative of an output voltage, output current or output power) via feedback input terminal 14. In embodiments, controller 10 controls a primary side switch of the power converter via converter control terminal 12. In embodiments, on-times of the primary side switch are controlled based on both the supply voltage and on the feedback signal. "Controlled based on both" as used herein may indicate that the on-times of the primary side switch are a function of both the feedback signal and the supply voltage. In some embodiments, the feedback signal may indicate an output at a main output terminal of the power converter. Determining the on-times based not only on the feedback signal, but also on the supply voltage in some embodiments may prevent a voltage at an auxiliary output dropping to low in case an output load at the main output terminal is reduced (for example light source arrangement switched off or switched to low power mode), in particular on cases where there is no feedback path from the auxiliary output to the controller.

Examples for such techniques and examples for such a combined control based on a supply voltage and a feedback signal indicating an output of the power converter, in particular a main output, will be discussed further below. Some embodiments use that a change, in particular a decrease, of the supply voltage in some implementations may indicate a or happen at the same time as a decrease of a voltage at an auxiliary output, if both are derived from a respective winding of a transformer.

Figure 2:
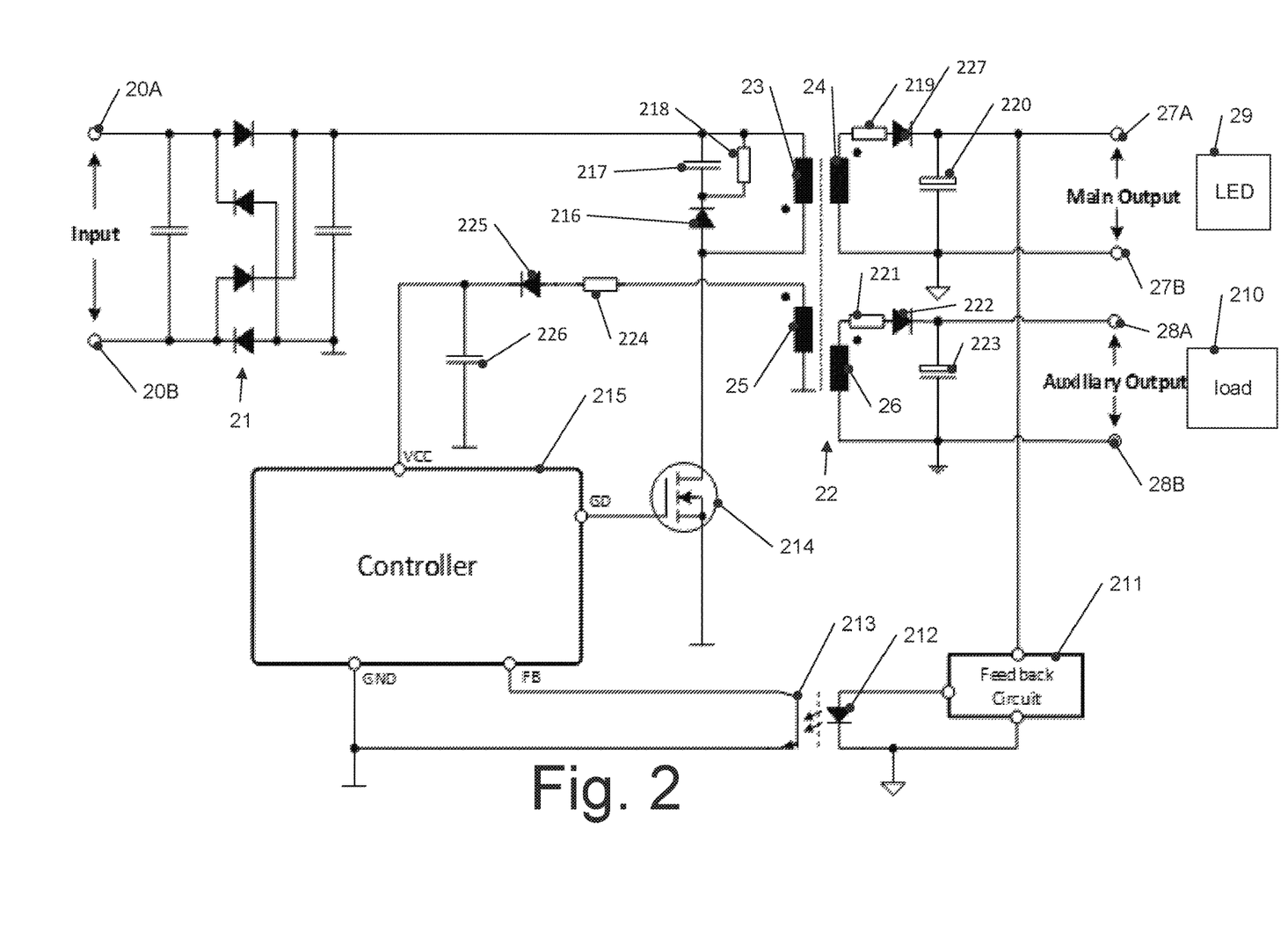
FIG. 2 as a circuit diagram of a power converter according to an embodiment.

FIG. 2 is a circuit diagram of a power converter according to an embodiment. While a specific implementation is shown in FIG. 2 as an example, techniques discussed herein may be used in a variety of power converters, as already explained above, in particular in various types of power converters providing an isolation between a primary side and a secondary side using a transformer. Furthermore, in addition to the components shown in FIG. 2, other components conventionally used in power converters may be provided, for example a power factor correction (PFC).

The power converter of FIG. 2 is operative to receive an input voltage at input terminals 20A, 20B. In case the input voltage is an alternating current (AC) voltage, for example a main voltage, a rectifying/filtering arrangement 21 is provided which comprises a bridge configuration of diodes for rectifying the voltage and capacitors for filtering. Other arrangements of filters and rectifiers may also be used. In case a direct current (DC) voltage is provided as input voltage, the rectifier may be omitted. The thus filtered and rectified voltage is applied to a terminal of a primary winding 23 of a transformer 22.

The power converter of FIG. 2 further comprises a primary side switch 214 controlled by a controller 215. Controller 215 may be implemented as discussed previously with respect to FIG. 1 for controller 10 and may control primary side switch 214 based on control schemes and techniques discussed above and discussed later in more detail referring to FIGS. 3-5. In the embodiment of FIG. 2, primary side switch 215 is implemented as a transistor switch, for example as a metal oxide semiconductor field effect transistor (MOSFET).

When switch 214 is closed (for example MOSFET is conducting between source and drain terminals), primary winding 23 is coupled between the rectified input voltage and ground via transistor 214. A primary current and magnetic flux in the transformer 22 increases, providing energy to transformer 22. This induces a voltage in secondary windings 24, 26 and in turn in an auxiliary winding 25 of transformer 22. In this stage, the induced voltage in windings 24, 26, 25 will be negative, reverse biasing diodes 227, 222 and 225, respectively. In this state, an output capacitor 220 supplies an output voltage at a main output terminal 27A, 27B, for example to power a light source arrangement like an LED (light emitting diode) arrangement 29. Such a light source arrangement may be directly or indirectly coupled to main output terminal 27A, 27B, e.g. be coupled via a current regulator. It should be noted that a light source arrangement serves merely as a non-limiting example for a load, and other types of loads may also be supplied. Moreover, an output capacitor 223 in this state provides an auxiliary output voltage at an auxiliary output 28A, 28B to power some further load 210, for example a sensor circuit. Controller 215 in this state receives a supply voltage VCC from capacitor 226.

Moreover, when primary side switch 214 is closed, diode 216 is reversed bias, such that no current flows through diode 216. Diode 216, a capacitor 217 and a resistor 218 form a so-called snubber circuit which in some implementation may suppress voltage transients which could otherwise occur in some implementations.

When primary side switch 214 is opened (such as deactivated), the primary current and magnetic flux in transformer 22 drops. A secondary voltage in secondary windings 24, 26 and in auxiliary winding 25 is positive forward biasing diodes 227, 222, 225, respectively. Therefore, energy flows from transformer 22 via resistors 219, 221 and 224, respectively, to charge capacitors 220, 223 and 226, respectively and to provide a main output voltage at main output 27A, 27B, an auxiliary output voltage at auxiliary output 28A, 28B and a supply voltage VCC to controller 215. Additionally, when primary side switch 214 is open, diode 216 is forward biased by the voltage of the transformer (voltage across primary winding 23), and current flows through diode 216 until the voltage across winding 26 is less than the voltage across capacitor 217.

Resistor 219, 221 and 224 serve for dampening voltage spikes. In embodiments, a resistance value of resistor 224 is greater than resistance values of resistor 221 to provide a greater damping to the supply voltage supplied to controller 215 to avoid voltage spikes. In some implementations, otherwise such voltage spikes could cause the supply voltage VCC not to reflect the behavior of the auxiliary voltage at auxiliary output 28A, 28B correctly.

By adapting the opening and closing of primary side switch 214, for example by modifying on-times of switch 214, i.e. times during which switch 214 is closed, an amount of energy provided to transformer 22 and therefore an output voltage at main output 27A, 27B, and/or auxiliary output 28A, 28B may be adjusted. For example, it may be ensured that an output voltage remains approximately constant at least at main output 27A, 27B in case of varying loads. Such varying loads, as already mentioned, may occur when for example a light source arrangement is dimmed, i.e. adjusted between a full light output and no light output.

To regulate an output voltage at main output 27A, 27B, a voltage at 27A is provided to a feedback circuit 211. In response to the voltage, feedback circuit 211 drives a light emitting diode 212.

Light from light emitting diode 212 is detected by a phototransistor 213. Therefore, light emitting diode 212 and phototransistor 213 form an optic coupler to transmit a feedback signal indicative of the voltage at main output 27A to a feedback input FB of controller 215. Controller 215 may then control primary side switch 214 to regulate the main output voltage at main output 27A, 27B to a predefined value. In some implementations, such a regulation may be important to correctly supply a load, for example light emitting diode arrangement 29, with power at an appropriate voltage.

Without further measures, in case of low or no load conditions at main output 27A, 27B, only little power is required to keep the main output voltage at the predefined level, such that in such a case the on-times of primary side switch 214 may be comparatively short. In cases where a comparatively high load is coupled to auxiliary output 28A, 28B, this could lead to an auxiliary output voltage at auxiliary output 28A, 28B decreasing, such that load 210 in such light or no load conditions may not be sufficiently be supplied.

In embodiments, controller 215 evaluates the supply voltage VCC and adjusts on-times of switch 214 not only based on the feedback signal received via feedback circuit 211, but in addition based on the supply voltage VCC. In particular, when in light load or no load conditions at main output 27A, 27B only little power is supplied from transformer 22 to the main output 27A, 27B. The power is mainly supplied to the secondary winding 26 for the auxiliary output 28A, 28B and to the auxiliary winding 25 for the supply voltage VCC. In case of a loaded auxiliary output 28A, 28B, also the supply voltage VCC derived from auxiliary winding 25 may drop and therefore be indicative of such light or no load conditions at the main output 27A, 27B and of a loaded auxiliary output 28A, 28B. Therefore, in embodiments based on the supply voltage VCC sufficient output power at an auxiliary output like auxiliary output 28A, 28B may be ensured even in cases where, as in FIG. 2, no feedback path from the auxiliary outputs 28A, 28B to the controller exists, as the supply voltage in this case serves as an indirect indication of a high load at the auxiliary output. In other words, the voltage over all loaded windings depends on the windings' turns ratios. Accordingly, if the voltage over secondary winding 26 drops due to high load at the auxiliary output, the voltage over auxiliary winding 25 will drop as well, leading to a reduced supply voltage being supplied to controller 215. Thus, the controller will be informed, inter alia, about voltage drops at the auxiliary output and may react accordingly by modifying on-times of primary side switch 214 to increase the supplied power, e.g. by extending a burst length as explained in more detail below.

Figure 3:
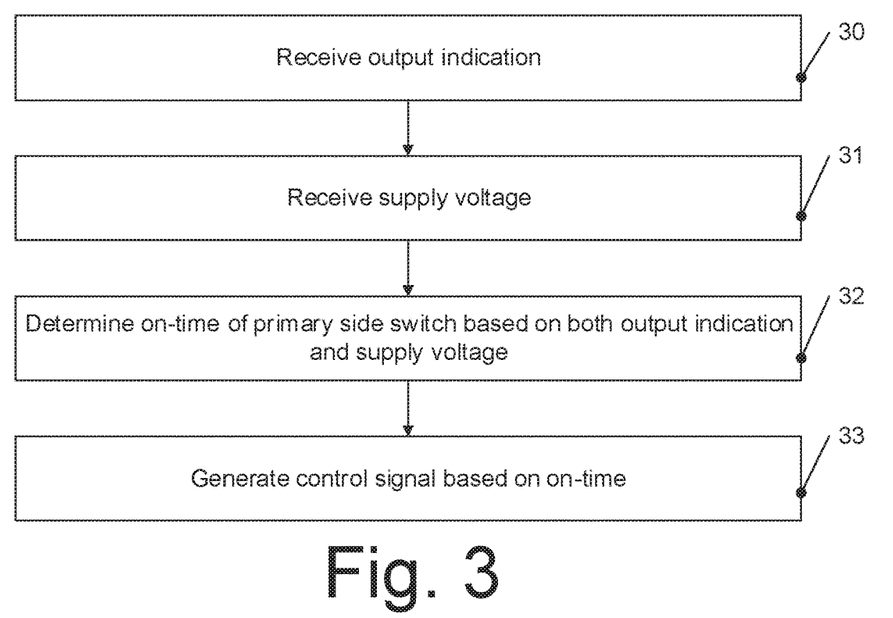
FIG. 3 is a flowchart of a method according to an embodiment.
Figure 4:
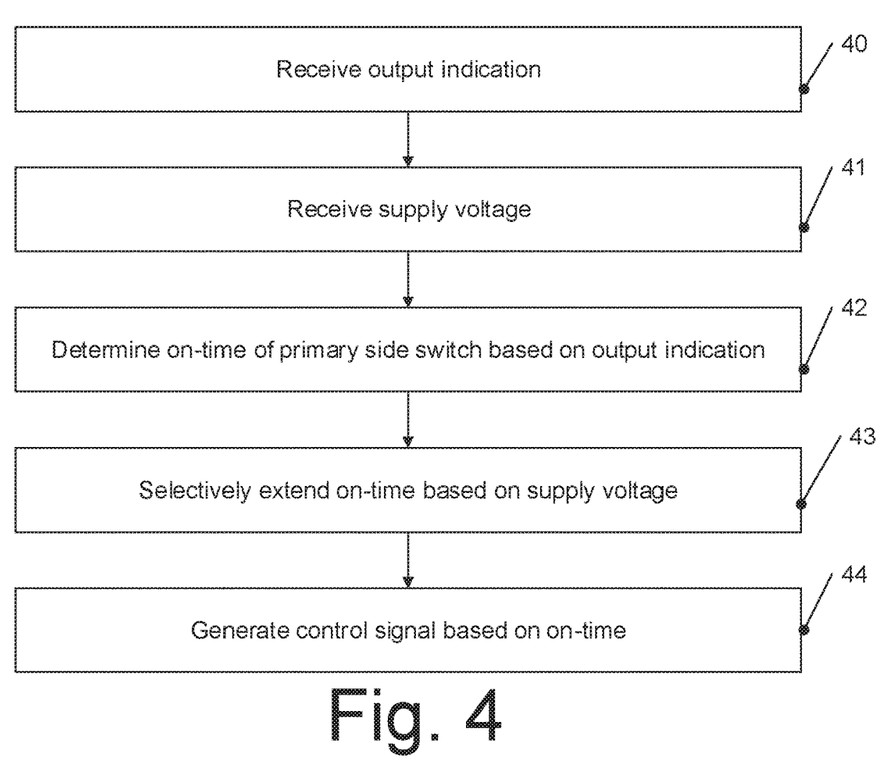
FIG. 4 is a flowchart of a method according to an embodiment.

To illustrate this further, FIGS. 3 and 4 are flowcharts of methods according to some embodiments, which may be implemented using controller 10 of FIG. 1 or controller 215 of FIG. 2, but are not limited thereto. For example, the method may be implemented in a controller using hardwired logic or by using programmable processors like microcontrollers programmed accordingly by program code provided on a respective computer-readable medium, for example in a flash memory, other type of memory or other data carrier like a CD or DVD.

While the methods of FIGS. 3 and 4 are each represented as a series of acts, operations, or events, the order in which these acts or events are represented and described is not to be construed as limiting. In some embodiments, acts or events may be executed in a different order than the one shown, and/or some acts or events may be performed in parallel, for example in different parts of a circuit like a controller.

Furthermore, while for ease of reference FIGS. 3 and 4 will be described referring to FIGS. 1 and 2, the implementation of the methods of FIGS. 3 and 4 is not limited to the specific controllers and power converters discussed with respect to FIGS. 1 and 2.

At 30, the method of FIG. 3 comprises receiving an output indication indicative of an output of a power converter. For example, in FIG. 2, controller 216 receives an indication of an output voltage at main output 27A, 27B via feedback circuit 211. In other embodiments, instead of an indication of an output voltage, an indication of an output current may be received, for example, if a current at an output is to be regulated instead of a voltage.

At 31, the method comprises receiving a supply voltage. In embodiments, the supply voltage is derived from an auxiliary winding of a transformer, as explained with respect to FIG. 2. The supply voltage may supply a controller or other circuit used for implementing the method of FIG. 3.

At 32, the method comprises determining on-times of a primary side switch based on both the output indication received at 30 and the supply voltage received at 31. In some embodiments, by taking both the output indication and the supply voltage into account, insufficient power at an auxiliary output like auxiliary output 28A, 28B in case on light or no load conditions at a main output from which the output indication is derived, for example main output 27A, 27B of FIG. 2, may be prevented.

At 33, a control signal for the primary side switch is generated based on the on-times, to control the primary side switch to have corresponding on-times.

It should be noted that setting on-times of a primary side switch may be performed in various ways. In some embodiments, a primary side switch may be continuously turned on and off, and the on-times may be varied. In other embodiments, a so-called burst mode operation may be used, where in a first part of a burst cycle the primary side switch is alternatingly opened/closed for a certain burst length with a fixed frequency, and in a second part of the burst cycle the primary side switch is permanently open. In such a case, the on-times may be varied by varying the burst length, without changing the individual on-times during the alternatingly switching on and off.

Changing the burst length may change a burst duty cycle, which may be defined as a ratio between the burst length (first part) and a length of the burst cycle (first part and second part).

FIG. 4 illustrates a method according to a further embodiment, which may be seen as a specific implementation example for the embodiment of FIG. 3. At 40, the method of FIG. 4 comprises receiving an output indication, and at 41, the method comprises receiving a supply voltage. 40 and 41 of FIG. 4 may be implemented as discussed for 30 and 31 of FIG. 3 above.

At 42, the method comprises determining on-times of a primary side switch based on the output indication. For example, a burst length may be determined based on the output indication such that the output from which the indication is derived (e.g. main output 27A, 27B of FIG. 2) is regulated to a desired voltage, current and/or power. This may be implemented in any conventional way for feedback-based regulation in power supplies. Briefly, essentially the on-times may be increased to provide more power (for example to provide more power to transformer 22 of FIG. 2) if the output indication indicates the output being below a desired value (for example voltage, current and/or power), and the on-times may be decreased if the output indication indicates that the output is above the desired value. For example, increasing or decreasing the on-times may comprise increasing or decreasing a burst length.

At 43, the method comprises selectively extending the on-times based on the supply voltage. "Selectively" here indicates that the on-times are extended, (increased), under certain conditions. In embodiments, the on-times may be extended when the supply voltage directly or indirectly indicates that an output power may be too low. In some implementations, extending the on-times may comprise extending a burst length.

At 44, the method then comprises generating a control signal for a primary side switch (for example switch 214 of FIG. 2) based on the on-times determined at 42 and selectively extended at 43.

Next, examples for selectively extending the on-times based on the supply voltage at 43 of FIG. 4 will be explained using examples.

In some embodiments, the primary side switch is operated in a burst mode. In some implementations, the supply voltage is compared to a threshold at or near the end of each burst. If the supply voltage is below the threshold, the burst may be extended until the supply voltage reaches the threshold.

Figure 5:
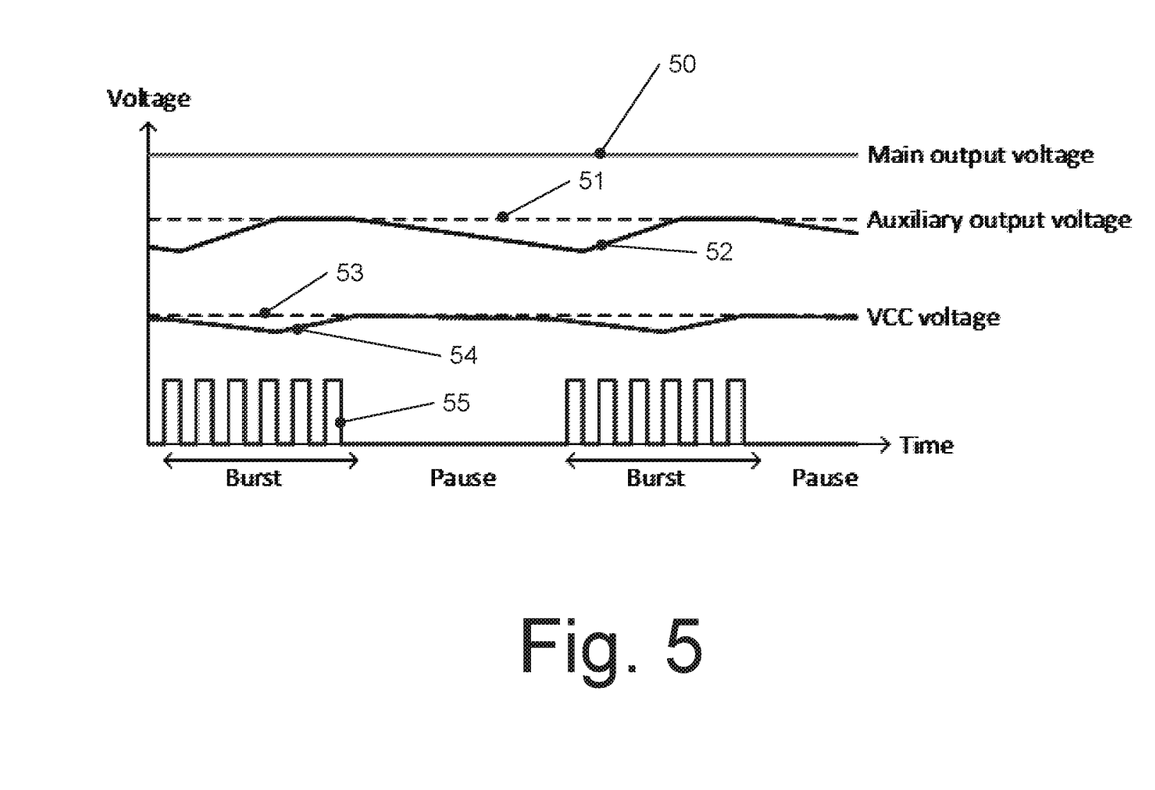
FIG. 5 shows example signals for some embodiments.

An example for such an approach will be illustrated referring to FIG. 5.

FIG. 5 illustrates example signal waveforms for an embodiment like the one shown in FIG. 2. It should be noted that the signal waveforms in FIG. 5 are given for illustration purposes only and are not to be construed as limiting. In particular, actual waveforms may depend on a particular application, and/or on operation conditions like an amount of power required by a load (that consumes energy) coupled to a respective power converter. While the signals of FIG. 5 will be described referring to FIG. 2, similar signals may occur in other implementations and configurations of power converters. FIG. 5 illustrates voltages of various signals over time.

A curve 50 illustrates an example for a main output voltage, for example at main output 27A, 27B of FIG. 2. This main output voltage is regulated (through the feedback via feedback circuit 211 in the example of FIG. 2) and is therefore stable at a predefined value in the example of FIG. 5. A curve 52 in FIG. 5 illustrates a voltage at an auxiliary output like auxiliary output 28A, 28B of FIG. 2. A dashed line 51 indicates a target value for the auxiliary output voltage. In the example of FIG. 5, the auxiliary output voltage is not regulated (no feedback from auxiliary output 28A, 28B in FIG. 2) and therefore varies. As previously explained, in case of a low load at the main output, a power supplied (for example to transformer 22 of FIG. 2) may not be sufficient to maintain a sufficiently high auxiliary output voltage to supply loads like load 210 of FIG. 2 without further measures.

A curve 54 illustrates a supply voltage VCC provided to a controller using an auxiliary winding, for example provided to controller 215 of FIG. 2 using auxiliary winding 25. Also this voltage varies and deviates from a target value indicated by a dashed line 53. The target values indicated by lines 51, 53 may in particular be defined by turns ratios of the transformer 22, i.e. a number of windings of primary winding 23, secondary winding 26 and auxiliary winding 25.

A curve 55 illustrates a control signal for a primary side switch, for example the control signal output to primary side switch 214 by controller 215 in FIG. 2. In the example of FIG. 5, the primary side switch is controlled in a burst mode, where bursts having a certain burst length where the switch is alternatingly open and closed with a fixed frequency are followed by pauses where the switch is continuously open. The burst length together with the pause time defines a length of a burst cycle. A ratio between the burst length and the length of the burst cycle is referred to as burst duty cycle herein. In embodiments, for varying the on-times the burst length and therefore the burst duty cycle is varied, while the frequency of the control signal during the burst is kept constant. In other embodiments, for example the length of the on-times during the burst may be varied.

In embodiments, as mentioned above, for selectively extending the on-times based on the supply voltage (43 of FIG. 4) the supply voltage (curve 54 of FIG. 5) is compared to a threshold value at or near the end of the burst. As can be seen in FIG. 5, if continuous power is supplied the supply voltage recovers towards the target value indicated by line 53 towards the end of the burst. In case the supply power is insufficient, the supply voltage does not fully recover. If the supply voltage is below a threshold, which threshold may be a predefined value below the target value 53, this may indicate that insufficient power is supplied, and in this case the burst length and therefore the burst duty cycle may be increased, thus supplying more power to transformer 22 in FIG. 2, for example. As both the auxiliary output voltage according to curve 52 and the VCC voltage according to curve 54 in embodiments like the one shown in FIG. 5 may depend on the power supply to a primary winding of transformer 22, extending the burst cycle also helps keeping the auxiliary output voltage at least near the target value 51. In other words, both the supply voltage and the auxiliary output voltage may be kept in a certain range determined by the threshold value using such a regulation.

In some implementations, the burst time may be extended until the supply voltage (curve 54) is at or above the predefined threshold. In such an implementation, the supply voltage may be continuously monitored during the burst or at least towards the end of the burst.

With such an embodiment, the supply voltage may be brought at least to the predefined threshold at the end of each burst time.

In another approach, a minimum burst time is determined based on a supply voltage measured at a predefined point in time, for example at an end of each burst. If the burst duty cycle determined at 42 in FIG. 4 is below this minimum, the burst duty cycle is set to this minimum, thus selectively extending the on-times at 43 in FIG. 4. The minimum duty cycles depending on the supply voltage at the end of each burst may for example be stored in a table in a memory. An example for such a table is shown below:

| VCC voltage at the end of a burst | Minimum duty cycle for the next burst |
|---|---|
| 8.00 V | 100% |
| 8.25 V | 75% |
| 8.50 V | 50% |
| 8.75 V | 25% |
| 9.00 V | 0% |

In this example, it is assumed that a target value (for example line 53 of FIG. 5) is at 9 V. If the supply voltage at the end of the burst is at 9 V, a minimum duty cycle for the next burst is set to 0% (i.e. burst length 0), which means that the burst length is determined based on the output indication. The farther the supply voltage at the end of the burst deviates from this target value, the higher a minimum duty cycle for the next burst cycle is set. It should be noted that the values shown in the above table serve merely for illustration and may vary depending on implementation. It should also be noted that the highest minimum duty cycle used in an implementation need not be at 100%, but depending on requirements may also be below 100%. Between the voltages explicitly shown in the table and stored, in some implementations, an interpolation may be used, or the minimum duty cycle for the next higher or next lower voltage in the table may be used. For example, if the minimum duty cycle for the next lower voltage is used, at a voltage of 8.6 V at the end of a burst, the minimum duty cycle for the next burst would be set to 50% in the example above, corresponding to the value for 8.5 V.

With this approach, only a single voltage, for example at the end of each burst, need to be measured in each burst. On the other hand, with this approach, no constant supply voltage at the end of each burst is assured, but the supply voltage at the end of each burst may vary to some extent.

With some of the embodiments above, a drop of an auxiliary output voltage in case of light or no load conditions at a main output may be prevented, and sufficient supply of loads coupled to such an auxiliary output (for example load 210 of FIG. 2) as well as sufficient supply of a controller (for example controller 215 of FIG. 2) with power may be ensured. Some embodiments allow to ensure sufficient output power at an auxiliary output for varying, for example continuously varying, load conditions at a main output.

Although specific embodiments have been illustrated and described herein, it will be appreciated by those of ordinary skill in the art that a variety of alternate and/or equivalent implementations may be substituted for the specific embodiments shown and described without departing from the scope of the present invention(s). This application is intended to cover any adaptations or variations of the specific embodiments discussed herein. Therefore, it is intended that this invention (or inventions) be limited only by the claims and the equivalents thereof.

LIST OF REFERENCE NUMERALS 10 power converter controller
12 output
13 input
14 input
15 control circuit
20A, 20B voltage input
21 input filter and rectifier
22 transformer
23 primary winding
24 secondary winding 25 auxiliary winding
26 secondary winding
27A, 27B main output
28A, 28B auxiliary output
29 LED arrangement
210 load
211 feedback circuit
212 light emitting diode
213 phototransistor
214 primary side switch
215 controller
216 diode
217 capacitor
218 resistor
219 resistor
220 capacitor
221 resistor
222 diode
223 capacitor
224 resistor
225 diode
226 capacitor
227 diode
30-33 method steps
40-44 method steps
50-55 curves

The invention claimed is:

1. A power converter comprising:
a voltage input coupled to a primary winding of a transformer, the transformer including an auxiliary winding;
a first secondary winding of the transformer coupled to a main output of the power converter, the first secondary winding producing an output signal outputted from the main output;
a second secondary winding of the transformer coupled to an auxiliary output of the power converter;
a primary side switch coupled to the primary winding of the transformer; and
a power converter controller comprising:
a first input coupled to the main output via a feedback path, the first input receiving an indication of the output signal of the power converter via the feedback path, a feedback link being absent between the auxiliary output and the power converter controller;
a second input operative to receive a supply voltage produced from the auxiliary winding; and
a control circuit operative to:
determine on-times of a primary side switch of the power converter based on both the indication of the output signal and the supply voltage, the on-times representing times in which the primary side switch provides a low impedance path between the primary winding and a reference voltage with respect to the voltage input; and
control the primary side switch based on the determined on-times.

2. The power converter of claim 1, wherein the control circuit is operative to control the primary side switch in a burst mode, where determining the on-times comprises determining a burst length of a burst of controlling the primary side switch to be the low impedance in the burst mode.

3. The power converter of claim 2, wherein determining the burst length comprises determining a burst duty cycle.

4. The power converter of claim 1, wherein determining the on-times comprises determining the on-times based on the indication and selectively extending a duration of the on-times based on the supply voltage.

5. The power converter of claim 4, wherein selectively extending the duration of the on-times comprises extending the duration of the on-times until the supply voltage is at a predefined value.

6. The power converter of claim 4, wherein selectively extending the duration of the on-times comprises determining a minimum on-time value based on the supply voltage, and setting the on-times to the minimum on-time value if the duration of the on-times is determined, based on the indication, below the minimum on-time value.

7. The power converter of claim 1 further comprising: a first damping resistor coupled between the auxiliary winding and the second input; and
a second damping resistor coupled between the second secondary winding and the auxiliary output,
wherein the first damping resistor provides greater damping than the second damping resistor.

8. The power converter of claim 1 further comprising: a dimmable light source coupled to the main output.

9. The power converter of claim 1, wherein the indication of the output signal indicates at least one of an output voltage or output current at the main output, wherein determining the on-times based on the indication comprises at least one of regulating an output voltage and an output current at the main output.

10. A method of operating a power controller, the method comprising:
receiving an indication of an output of the power converter;
receiving a supply voltage generated by the power converter using an auxiliary winding of a transformer of the power converter, wherein the supply voltage supplies a controller of the power converter with power, a feedback link being absent between the power converter and an auxiliary output of the power controller;
determining, by the controller, on-times of activating a primary side switch of the power converter based on both the indication and the supply voltage; and
controlling, by the controller, the primary side switch based on the determined on-times.

11. The method of claim 10, wherein determining the on-times comprises determining durations of the on-times based on the indication, and selectively extending the durations of the on-times based on the supply voltage.

12. The method of claim 11, wherein selectively extending the durations of the on-times comprises selectively extending the durations of the on-times until the supply voltage reaches a predefined value.

13. The method of claim 11, wherein selectively extending comprises determining minimum on-time values based on the supply voltage, and setting the durations of the on-times to the minimum on-time values if the on-times determined, based on the indication, are below the minimum on-time values.

14. The method of claim 10, wherein the indication of the output indicates at least one of an output voltage or output current at the main output, wherein determining the on-times based on the indication comprises at least one of regulating an output voltage or an output current at the main output.

15. The method of claim 10, wherein the on-times are determined to keep at least one of the supply voltage or a voltage at the auxiliary output within a predefined voltage range.

16. The power converter of claim 1, wherein the supply voltage powers the power converter controller.

17. The power converter of claim 16, wherein the indication of the output signal is first feedback; and wherein the control circuit is operative to determine the on-times of the primary side switch based on a combination of a magnitude of the supply voltage and a magnitude of the first feedback.

18. The power converter of claim 17, wherein the determined on-times of the primary side switch prevent the auxiliary output from outputting insufficient power to a respective load coupled to the auxiliary output.

19. The power converter of claim 1, wherein a magnitude of the supply voltage received at the control circuit from the auxiliary winding provides an indication of a magnitude of a respective load coupled to the auxiliary output.

20. The power converter of claim 19, wherein the control circuit selects durations of the on-times based on the supply voltage, the selected durations ensuring that the auxiliary output provides a threshold amount of power to a respective load.

21. The power converter of claim 1, wherein the primary winding, auxiliary winding, first secondary winding, and the second secondary winding are magnetically coupled to each other; and wherein the determined on-times of the primary side switch based on the supply voltage and the output signal of the main converter prevent the auxiliary output from outputting insufficient power to a respective load coupled to the auxiliary output.

22. The power converter of claim 1, wherein the output signal from the main output of the power converter powers a first load; and wherein the auxiliary output of the power converter powers a second load.

23. The power converter of claim 22, wherein the first load varies over time; and wherein the determined on-times of controlling the primary side switch based on the supply voltage and the output signal of the main converter prevents the auxiliary output from outputting insufficient power to the second load.

24. The power converter of claim 1, wherein the control circuit is operative to produce the on-times to maintain the supply voltage within a predefined range.

25. The power converter of claim 1, wherein the control circuit is operative to produce the on-times to maintain a magnitude of the auxiliary output within a predefined range.

* * * * *